United States Patent Office 3,303,210
Patented Feb. 7, 1967

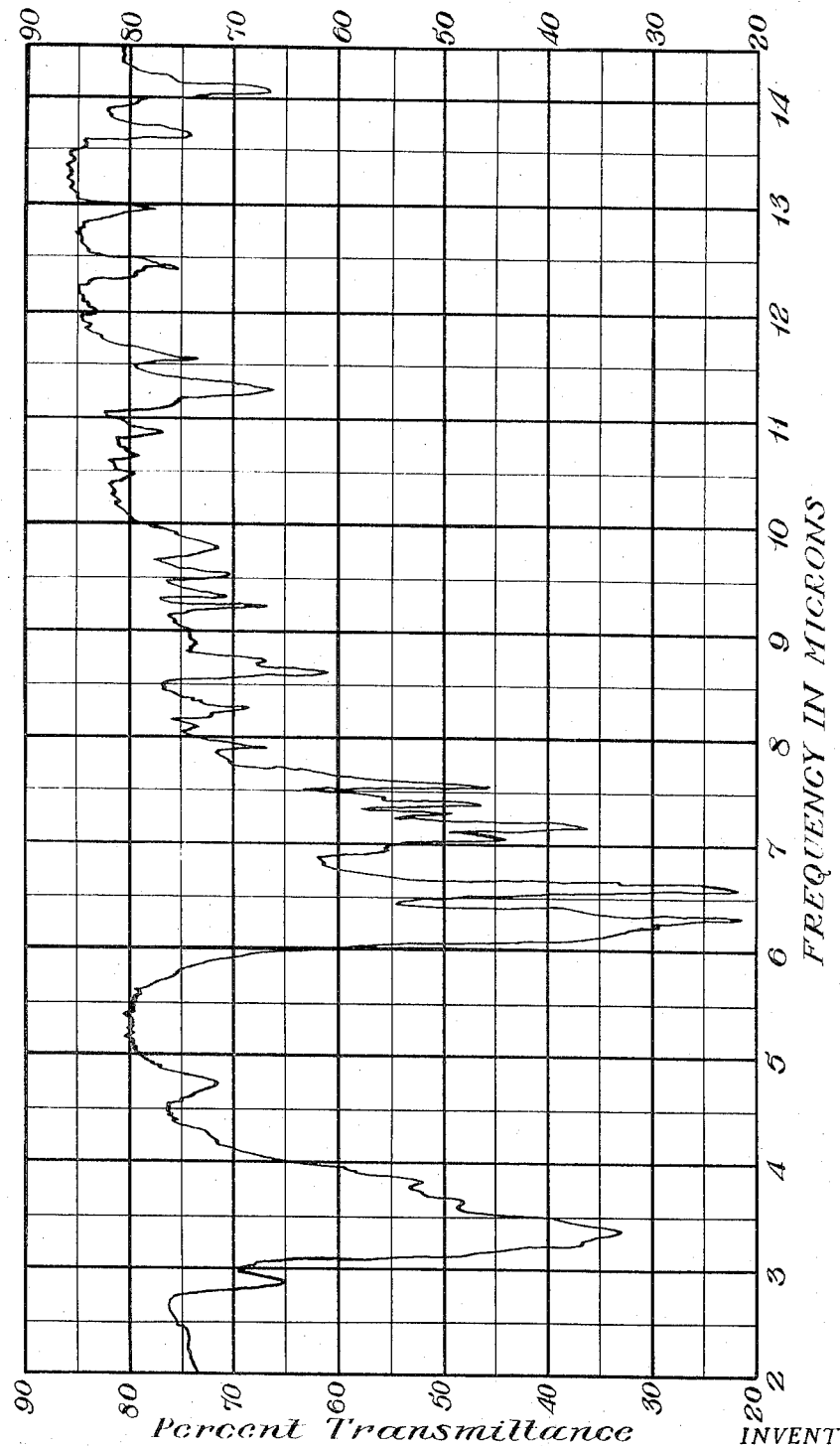

3,303,210
3-CYCLOHEXENE-1-GLYCINES AND 1-HYDROXY-
ACETATES AND PRODUCTION THEREOF
Walter D. Celmer, New London, Conn., assignor to Chas.
Pfizer & Co., Inc., New York, N.Y., a corporation of
Delaware
Filed July 5, 1963, Ser. No. 292,848
6 Claims. (Cl. 260—468)

This invention relates to organic compounds which are useful as antibiotic substances. More particularly, it is concerned with novel, optically-active forms of 3-cyclohexene-1-glycine and 3-cyclohexene-1-hydroxyacetic acid, with alkali metal and alkaline earth metal salts thereof with acid-addition salts of the glycine and with their ester and amide derivatives. The invention also contemplates processes, both fermentative and synthetic, for the preparation of the valuable new compounds, and methods for their recovery.

This invention relates specifically to compounds selected from the group consisting of those of the formula:

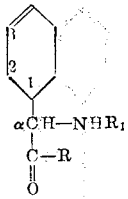

wherein:
(a) R is selected from the group consisting of hydroxyl, alkoxyl containing up to ten carbon atoms, phenoxyl, alkyl-substituted phenoxyl containing up to ten carbon atoms, benzyloxyl, amino and monoalkylamino containing up to ten carbon atoms;
(b) $R_1$ is selected from the group consisting of hydrogen, alkanoyl containing up to ten carbon atoms, benzoyl, alkyl-substituted benzoyl containing up to ten carbon atoms and benzyloxycarbonyl; the compound wherein R is hydroxyl and $R_1$ is hydrogen having in its pure crystalline form a melting point, with decomposition, of above about 300° C., a specific rotation of $[\alpha]_D$, +110° (±10°) (c. 1 in 2% aq. $H_3PO_4$) and which in a potassium bromide pellet exhibits characteristic absorption in the infrared region of the spectrum at the following frequencies expressed in microns: 2.90, 3.40 (cluster), 3.65, 3.80, 4.70, 6.30, 6.60, 7.05, 7.15, 7.25, 7.60, 7.95, 8.25, 8.65, 9.20, 9.30, 9.55, 9.80, 10.45, 10.65, 10.90, 11.30, 11.60, 12.00, 12.40, 12.95, 13.70, 14.10; and alkali metal, alkaline earth metal and acid addition salts of said compounds. The infrared absorption spectrum of the said compound in a potassium bromide pellet within the characteristic region of wavelengths between 2 and 15 microns is shown in the accompanying drawing, FIG. 1. The specific rotation is a characteristic property of the novel (+)-3-cyclohexene-1-glycine of this invention; specific rotation is defined as the angle of rotation, $\alpha$, produced by one cubic centimeter of a material with sodium light and is determined by solution of the equation $$[\alpha] = \frac{100a}{lc}$$

where [$\alpha$] is the specific rotation, $a$ the observed angle, $l$ the length of the column in decimeters, and $c$ the concentration (g. per 100 cc.).

It will be recognized that the ring carbon atom to which the aminoacetate group is attached, designated 1 in the formula above, is asymmetric, that is, it can be said to have four different radicals or atoms attached to it. Furthermore, the side chain carbon atom to which the amino group is attached, designated $\alpha$ in the formula above, is also asymmetric. By virtue of these two asymmetric carbon atoms, 1 and $\alpha$, among the compounds having the formula set out there are four optically-active forms, the so-called stereoisomeric 3-cyclohexene-1-glycines. These comprise two distinct geometric forms and their respective enantiomorphs. The instant invention contemplates only one of the possible optically-active stereoisomers of the formula set out above, and derivatives thereof, and that is one which turns the plane of polarized light to the right, that is, clockwise, and which is hereinafter referred to as the dextrorotatory form, or the (+)-form and which possesses the enhanced antibiotic activity against Gram-negative organisms, disclosed hereinafter.

Particurly effective as an antibiotic is dextrorotatory (+)-3-cyclohexene-1-glycine, the compound of the formula above wherein R is hydroxyl and $R_1$ is hydrogen.

This useful activity against a variety of organisms permites the application of the microbiologically-active stereoisomeric forms of the instant compounds in therapeutics, in veterinary medicine and in agriculture. The new antibiotics are also of use in industrial fermentations to prevent contaminatioin by sensitive organisms. They have activity in medical diagnostic techniques and, in addition, are useful in separating and classifying organisms.

Specific mention is made of the facts that an optically-inactive compound having the Formula I set out above, and in the appended claims, and wherein R is hydroxyl and $R_1$ is hydrogen has been reported in the art and is known to have antibiotic properties. The (+)-3-cyclohexene-1-glycine of the instant invention is distinguishable over the said optically inactive 3-cyclohexene-1-glycine of Edelson et al., volume 80, p. 2698, 1958, Journal of the American Chemical Society, in several respects all of which indicate clearly that it is a novel compound not heretofore available to, nor contemplated by, the art. As will be shown hereinafter, the (+)-3-cyclohexene-1-glycine has many times more antibacterial activity, on an equal weight basis, against Gram-negative organisms than that of the Edelson compound. Furthermore, there are clear differences in infrared spectra between the Edelson glycine and the glycine of the instant invention; particular attention is drawn, in the spectrum of the instant compound, FIG. 1, to absorptions at frequencies of 7.15, 7.25, 12.95 and 14.2 microns, which absorptions are absent in Edelson's compound and to an absorption at 7.35 microns in the Edelson compound, which absorption is absent in the instant compound.

While the reasons for the clearly different infrared spectra and unusual enhancement in potency are not fully understood, it is believed that the Edelson antibiotic represents D,L-allo-3-cyclohexene-1-glycine while the instant antibiotic has a completely distinguishable configuration.

The uniqueness of the instant compounds in comparison with that of Edelson may be understood by reference to the following facts and conclusions derivable therefrom:

The infrared absorption qualities exhibited by the (+)-3-cyclohexene-1-glycine of this invention and the synthetic, optically inactive 3-cyclohexene-1-glycine are clearly distinctive. Since infrared measurements do not distinguish enantiomorphs but will differentiate geometric isomers, it is apparent that in a relative sense the Edelson glycine represents (±)-allo-3-cyclohexene and not a (±) racemate obtainable from the (+)3-cyclohexene of this invention.

The uniqueness of the instant compound can be developed further in an absolute sense by consideration of additional properties of the instant (+)-3-cyclohexene-1-glycine and related compounds. Thus, catalytic hydrogenation of the instant glycine leads to absorption of one molar-equivalent of hydrogen and affords dextrorotatory, $[\alpha]_D = +20°$ (c. in 5 N HCl), cyclohexane glycine:

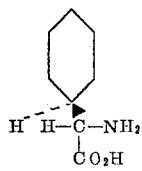

This compound is a known L-amino acid, Rudman et al., vol. 74, Journal of the American Chemical Society, p. 551, 1952. The reduction thus establishes the absolute configuration of the α-amino substituent in the compound of the instant invention. To avoid ambiguity the representation, αS, developed by Cahn et al. in volume 12, Experientia, p. 81, 1956, and known to and used by those skilled in the art is used to define the configuration of the asymmetric center designated α in Formula I above.

In the Cahn et al. system each of the four stereoisomeric 3-cyclohexene-1-glycines capable of existence are designated in absolute terms as follows:

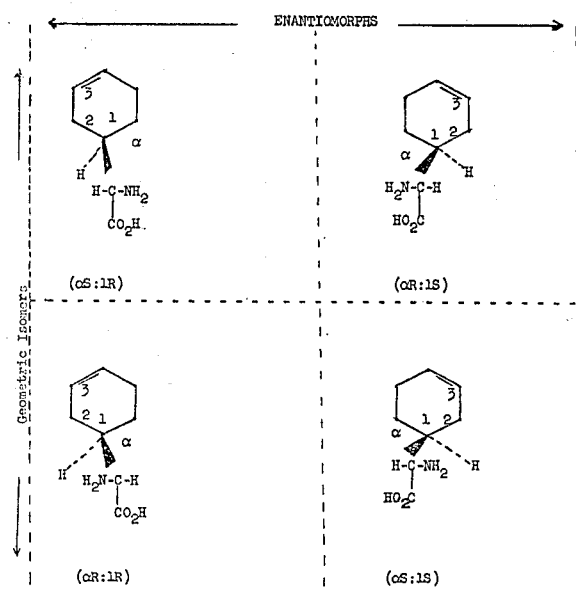

The compound of the instant invention has the stereochemical configuration designated αS:1R. This follows having defined Edelson's compound as (±)-allo-3-cyclohexene-1-glycine, a 1:1 mixture comprising the glycines with configurations designated αR:1R and αS:1S, respectively. These structures are arrived at as follows:

Having assigned the S-configuration to the α-substituent in the instant (+)-3-cyclohexene-1-glycine, assignment of the configuration about asymmetric site designated 1 in Formula I is made by noting that reduction of the compound, with hydrogen, leads to symmetry at site 1 with considerably diminished dextrorotation, $$[\alpha]_D = 110 \pm 10° \rightarrow [\alpha]_D = +20$$

thus asymmetric site 1 must contribute in a positive direction to the observed rotation of (+)-3-cyclohexene-1-glycine. As is a common practice in the art, insight into the absolute configuration of the dextrorotatory asymmetric site designated 1 in Formula I is gained by examination of analogous compounds in which direction of rotation and configurational specifications are known. Two such compounds are (R)-limonene and (R)-α-terpineol:

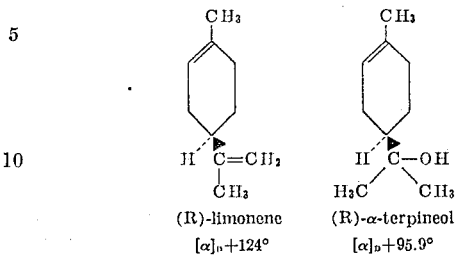

The R-configurations of these compounds have been established; cf. Cahn et al., loc. cit., p. 85; Richter and Wolff in volume 63, Berichte, p. 1724, 1930 and Stephan, in volume 62, J. pr. Chem., p. 53, 1900. It is clear that the instant compound has the configuration, in the Cahn system, αS:1R.

The instant invention also contemplates compounds of the formula:

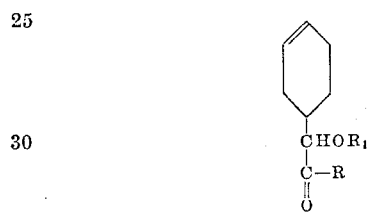

wherein:
(a) R is selected from the group consisting of hydroxyl, alkoxyl containing up to ten carbon atoms, phenoxyl, alkyl-substituted phenoxyl containing up to ten carbon atoms, benzyloxyl, amino and monoalkylamino containing up to ten carbon atoms; and
(b) $R_1$ is selected from the group consisting of alkanoyl containing up to ten carbon atoms, benzoyl, alkyl-substituted benzoyl containing up to ten carbon atoms and the alkali metal and alkaline earth metal salts thereof. These compounds are useful as antibiotics in their own right and are especially useful in that they serve as valuable intermediates in the preparation of the hereinbefore described glycines. Specific mention is made of a particularly valuable compound for these purposes, namely, (+)-3-cyclohexene-1-hydroxyacetic acid, the compound of the formula above wherein R is hydroxyl and $R_1$ is hydrogen. As an intermediate, for example, the hydroxyl group may be sequentially replaced by halogen and then by amino to obtain the said glycine. When the dextrorotatory (+)-3-cyclohexene-1-hydroxyacetic acid is carried through this two-step sequence, the final product retains the desired dextrorotatory configuration and the active antibiotic is thus obtained without loss of its anti-microbial effectiveness.

As mentioned above, it is known that 3-cyclohexene-1-glycine prepared synthetically by the procedure of Edelson inhibits the growth of *Escherichia coli*. The said synthetic 3-cyclohexene-1-glycine is optically inactive and, in comparative measurements by standard dilution techniques, Table I, and the determination of zones of inhibition by agar diffusion techniques, Table II, the dextrorotatory form of 3-cyclohexene-1-glycine contemplated by the instant invention is surprisingly substantially more potent than the synthetic compound.

In Table I are summarized the minimum inhibitory concentrations in micrograms per milliliter of the optically-inactive 3-cyclohexene-1-glycine prepared by the procedure of Edelson in comparison with corresponding data for the dextrorotatory (+)-3-cyclohexene-1-glycine prepared by the fermentation process of the instant invention.

TABLE I.—MINIMUM INHIBITING CONCENTRATIONS (M.I.C.) AGAINST VARIOUS BACTERIA

| Bacteria | (+)-3-cyclohexene-1-glycine (This invention), M.I.C. | 3-cyclohexene-1-glycine (Edelson), M.I.C. |
|---|---|---|
| A. aerogenes | 1.95 | 31.2 |
| E. coli | 0.95 | 1.95 |
| Proteus vulgaris | 7.8 | 250 |
| Pseudomonas | >250 | >250 |
| Salmonella | 0.95 | 31.2 |
| Streptococcus | 125 | 125 |
| Staphlyococcus | 250 | 250 |
| Pasteurella | >250 | >250 |

These data clearly indicate that the dextrorotatory compound contemplated by the instant invention is substantially more effective against most of the Gram-negative bacteria and at much lower concentrations than the optically inactive compound disclosed in the prior art.

In Table II are summarized the comparative zones of inhibition against A. aerogenes for the instant (+)-3-cyclohexene-1-glycine and the 3-cyclohexene-1-glycine of Edelson. The greater the diameter of the zones, the more effective is the compound being tested.

TABLE II.—COMPARATIVE ZONES OF INHIBITION VS. A. AEROGENES

| Compound per Disc (15 mm.), Micrograms | (+)-3-cyclohexene-1-glycine (This invention), mm. | 3-cyclohexene-1-glycine (Edelson et al.), mm. |
|---|---|---|
| 2,000 | 50 | 39 |
| 1,000 | 45 | 34 |
| 500 | 44 | 32 |
| 250 | 40 | 29 |
| 125 | 39 | 25 |
| 62.5 | 36 | 19 |
| 31.25 | 34 | 16 |
| 15.6 | 30 | NZ |
| 7.8 | 26 | NZ |
| 3.9 | 24 | NZ |
| 2.0 | 21 | NZ |
| 1.0 | 17 | NZ |
| 0.5 | 16 | NZ |

NZ—No zone of inhibition observable.

There are also observed differences between these compounds in their ability to protect mice against E. coli infections. Thus, at an effective dose level of E. coli which kills all the mice in a control group of 10, it is found that all the mice are also killed in a group of 10 treated with Edelson's said optically-inactive synthetic form of 3-cyclohexene-1-glycine, while 4 out of a group of 10 survive when treated with the dextrorotatory form of the instant invention; the dosages of both compounds are given at a rate of 800 mg. per kg., subcutaneously.

The dextrorotatory form of 3-cyclohexene-1-glycine contemplated by the instant invention may be obtained by a fermentation process. The process for the preparation of (+)-3-cyclohexene-1-glycine comprises:

(a) Cultivating an organism selected from the group consisting of Streptomyces antibioticus ATCC 11891 and S. antibioticus, ATCC 14890 in an aqueous nutrient medium containing a carbohydrate and a source of organic and inorganic salts under submerged aerobic conditions until substantial antimicrobial activity against A. aerogenes is imparted to said medium;

(b) Acidifying said medium to a pH of below 5;

(c) Contacting said medium with a particulate cation exchange resin in the acid form until said glycine is substantially completely adsorbed;

(d) Separating the glycine-resin adsorbate and (e) Recovering said glycine from said adsorbate.

The organisms which are employed in the valuable fermentation process of the present invention have been identified to be strains of a species of microorganisms known as Streptomyces antibioticus. Cultures of these strains have been deposited in the American Type Culture Collection, Washington, D.C., and have been assigned the numbers, ATCC 11891 and ATCC 14890.

The description for strain ATCC 14890 is set forth in detail in U.S. Patent No. 3,271,439 of W. D. Celmer, issued September 6, 1966, and assigned to the assignee of the instant application. The description of strain ATCC 11891 is set forth in U.S. Patent 2,757,123, which strain was therein taught as producing the basic antibiotic, oleandomycin, described and claimed therein. It has been surprisingly found that the two crystalline antibiotics of the instant invention, namely, (+)-3-cyclohexene-1-glycine and (+)-3-cyclohexene-1-hydroxyacetic acid, are co-produced with dextrorotatary (+)-3-cyclohexene-1-glyoxylic acid and oleandomycin by strain ATCC 11891. In contrast, the first mentioned strain of the instant application, ATCC 14890, produces only dextrorotatory (+)-3-cyclohexene-1-glycine, dextrorotatory (+)-3-cyclohexene-1-hydroxyacetic acid and dextrorotatory (+)-3-cyclohexene-1-glyoxylic acid, and no oleandomycin. Co-production of the new antibiotics by the old strain ATCC 11891 has not been observed before, since the strain has been used to produce a basic antibiotic and the valuable acidic antibiotics of the instant invention have heretofore been discarded in the sewer liquor without having been characterized or isolated.

The aforesaid copending application provides a detailed description of differences in the growth behavior between the two strains, ATCC 11891 and ATCC 14890, disclosed in the processes claimed herein.

It is to be understood that for the production of (+)-3-cyclohexene-1-glycine and (+)-3-cyclohexene-1-hydroxyacetic acid, the present invention is not limited to these particular strains or to strains fully answering their description. It is especially desired and intended to include the use of mutants produced from the described organism by various means such as X-radiation, ultraviolet radiation, nitrogen mustards and the like. It is contemplated also to include any organism regardless of its appearance or physiological behavior, that may be developed by transformation, transduction, genetic recombination or some other genetical procedure using a nucleic acid or an equivalent material from the described species whereby it has acquired the ability to produce the elaboration product described herein and claimed.

Either of the strains of Streptomyces antibioticus contemplated herein and mentioned in the aforesaid copending application and patent will grow on many media for the propagation of Streptomycetes. A satisfactory medium is Pridham's Yeast Extract Agar. A mixture of 4.0 g. of yeast extract, 10.0 g. of malt extract and 4.0 g. of dextrose in 1000 ml. of water is adjusted to pH 7.3 with sodium hydroxide, 20.0 g. of agar is added, the mixture is steamed for 15 to 20 minutes, dispensed, and then is sterilized for 15 minutes at 121° C. The culture should be incubated at 28° C.

(+)-3-cyclohexene-1-glycine, (+)-3-cyclohexene-1-hydroxyacetic acid and their alkali metal and alkaline earth metal salts and their ester and amide derivatives are remarkably effective in treating a number of infections. They exhibit significant activity against a wide variety of microorganisms. However, they are particularly noteworthy in their action on Gram-negative organisms. While they demonstrate some activity against Gram-positive organisms, this activity is generally of a somewhat lower level.

It is to be understood that for the purpose of treatment of infections with the valuable compounds of the instant invention, either the pure materials or one of the crude forms of the antibiotic may be used. This is to include either a filtered fermentation broth, as produced from, for example, either of the designated strains, or a solid or liquid concentrate prepared therefrom. For administration to man and animals, a non-toxic carrier is, of course, selected. Toxicity for this purpose being defined as an adverse effect on the treated host at the level of ordinary use. Either liquid or solid pharmaceutical carriers may be employed, including water, aqueous ethanol, isotonic saline or glucose, starch, lactose, calcium phosphate, animal feed stuffs, or mixtures of various materials as occur in a filtered fermentation broth. Either oral or parenteral administration is satisfactory, although the parenteral route is perhaps preferable until a satisfactory regimen adapted to the patient is established. For this purpose, solutions or suspensions in water, oils, such as peanut oils, or other pharmaceutically acceptable solvents or vehicles may be employed. Solid preparations for extemporaneous dilution can be prepared containing various buffering agents, local anaesthetics, and other medicinal agents including antibiotics, hypnotics, analgesics, as well as inorganic salts to afford desirable pharmaceutical properties to the composition.

The present invention embraces the process for growing *Streptomyces antibioticus*, Strains ATCC 11891 and ATCC 14890, under controlled conditions to produce (+)-3-cyclohexene-1-glycine and (+)-3-cyclohexene-1-hydroxyacetic acid and recovery of the antibiotics from the fermentation broth. The culture is grown submerged in an aqueous nutrient medium containing a source of nitrogen, a carbohydrate and minerals.

A satisfactory medium contains 10 g./l. of Cerelose (dextrose hydrate), 5 g./l. of Curbay-BG (molasses residue), 10 g./l. of cornstarch, 10 g./l. of soybean meal, and 5 g./l. of sodium chloride. The medium is adjusted to pH 7.0 with 1 N potassium hydroxide, calcium carbonate, 10 g./l., is added and the broth is sterilized at 121° C. for 30 minutes. It is inoculated with 2–7% of a 40–60 hour old culture grown in the same medium. Fermentation can be carried out at about 26–30° C. in 4-liter stirred glass jars, mechanically aerated, for from about 65 to about 130 hours. The progress of the fermentation can be followed by standard plate assay methods using the activity of the broth against *Aerobacter aerogenes*.

After a satisfactory level of antibiotic activity has been obtained, the active substances may be recovered by procedures well known to those skilled in the art. A particularly satisfactory procedure to recover the pure forms from mixtures is outlined in the following sequence:

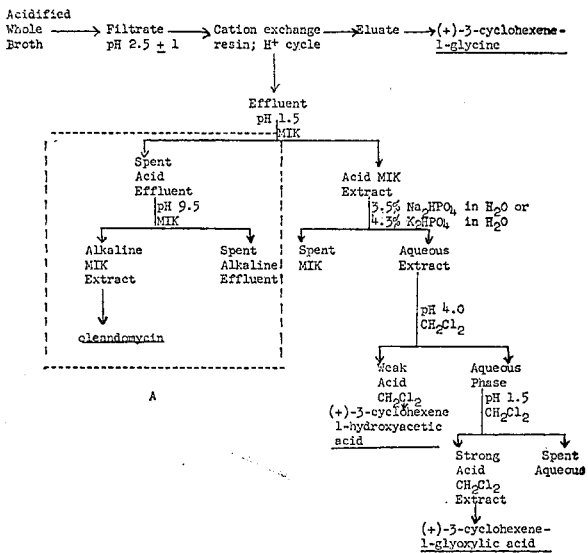

wherein H+ cycle refers to the hydrogen ion form of the resin, MIK designates methyl isobutyl ketone and $CH_2Cl_2$ designates methylene chloride.

As has been mentioned hereinbefore, one of the strains contemplated by this invention provides the instantly claimed antibiotic substances without co-producing oleandomycin; this strain is designated ATCC 14890. Referring to the separation scheme outlined above, it is obvious that if this strain is used it is not necessary to apply those steps outlined within the dashed lines enclosing the area of the sequence designated A. If, on the other hand, strain ATCC 11891 is used in conjunction with the steps outlined in the area of the sequence designated A, there will be obtained, in addition to the new antibiotics of the instant invention, oleandomycin as well. In any event, the sequence outlined provides a means for recovering the two antibiotics of this invention in pure form free from (+)-3-cyclohexene-1-glyoxylic acid, claimed in the aforesaid copending application, and free from oleandomycin.

Referring to the outline, the whole broth is filtered and then is adjusted to a pH of 2.5 ±1. The broth is then treated with a quantity of cation exchange resin in the hydrogen cycle, of sufficient capacity to remove all of the said glycine present. It is found that 7% based on the broth volume of resin is usually sufficient although the necessary quantity may be readily determined by analysis. While the exact type of resin employed is not critical, it has been found especially convenient to use a sulfonated polystyrene exchange resin of 20–50 mesh partical size, such as Amberlite IR–120 produced by the Rohm and Haas Co., Philadelphia, Pa., and which has been converted from the sodium form to the hydrogen form with mineral acid and washed to a pH of about 4 with deionized water. It is preferred for ease of operation to conduct the treatment with the ion exchange resin in a tower and the following procedure will be referred to in terms of using a tower although the procedure will serve equally well if a batch type adsorption process is used. After the broth is passed into the tower, the tower hold up is discarded, and then effluent is collected until a volume equal to the original broth volume has been collected. It is observed that the pH of the effluent decreases from 1.5 to 1.7. The tower effluent which contains oleandomycin (when ATCC 11891 is used), the glyoxylic acid of the said copending application and the said hydroxyacetic acid of the instant invention is reserved for later recovery. The tower is next washed with deionized water until the effluent pH reaches from about 4.0 to 4.3 then the wash water is discarded.

The ion exchange resin, which contains adsorbed thereon the said glycine is treated with 1.5 N ammonium hydroxide solution in an amount to provide approximately 15 to 20% of the original broth volume. After the pH of the eluate from the tower increases above about 5, the eluate is collected until an amount equivalent to about 10 to 15% of the original broth volume is taken. The eluate is concentrated in a vacuum at a temperature of about 30 to 40° C. until it is from about ⅔ to about ½ the original volume; during this step the excess ammonia is removed. Mineral acid is then added and the pH is adjusted to 4.5; concentration is continued until the concentrate contains about 10% by weight of total solids are filtered off and are washed with a small amount of water. The filter cake is washed with 95% ethyl alcohol and then is air dried. The product, (+)-3-cyclohexene-1-glycine can be further purified by suspension in about 100 parts by weight of water, adjustment of the suspension to a pH of 1.75 with mineral acid, treatment with about ⅔ by weight of glycine with discolorizing charcoal, filtration and adjustment to pH 4.5 with a solution of base such as potassium hydroxide. The resulting crystalline suspension, after being allowed to stir overnight, is filtered and the recovered crystals are dried to a constant weight.

For isolation of the said (+)-3-cyclohexene-1-hydroxyacetic acid of the instant invention, the effluent, which has been reserved as mentioned above, is adjusted, if necessary, to pH 1.5 with mineral acid, then is extracted with about one-fifth volume of methyl isobutyl ketone (MIK). If, in accordance with the scheme mentioned above, strain ATCC 11891 has been employed, which strain co-produces oleandomycin, the oleandomycin, being basic, remains in the spent acid effluent after removal of the methyl isobutyl ketone extract. The spent acid fraction is suitable for oleandomycin recovery which can be carried out, for example, by adjusting the pH to 9.5 with alkali, extracting with methyl isobutyl ketone, then with dilute mineral acid at a pH of abou 1.5, then washing the acid extract with chloroform, then with heptane.

The methyl isobutyl ketone fraction, containing the said 1-hydroxyacetic acid, is extracted with a buffer solution comprised of aqueous 3.5% disoduim hydrogen phosphate or of aqueous 4.3% dipotassium hydrogen phosphate. About one-fifth volume of buffer per volume of organic solution is sufficient. The spent methyl isobutyl ketone layer is discarded, and the aqueous buffer is adjusted to pH 4.0 with mineral acid, over methylene chloride. The methylene chloride layer is separated, the solvent is evaporated, and there remains, as a residue, (+)-3-cyclohexene-1-hydroxyacetic acid (+)-3-cyclohexene-1-glyoxylic acid, described and claimed in the said copending application, can be recovered from the aqueous phase by adjusting to pH 1.5 with mineral acid, over methylene chloride, the methylene chloride phase is separated and equal volume of isopropanol is added thereto and the methylene chloride is displaced by distillation. The isopropanol solution is adjusted to pH 5.5–6.0 with 3 N methanolic potassium hydroxide, the solution is concentrated and the crystals which are formed are separated by filtration and washed with isopropanol. There is thus obtained (+)-3-cyclohexene-1-glyoxylic acid in the form of its crystalline potassium salt.

As will be exemplified hereinafter, common procedures well known to those skilled in the art can be used to prepare the alkali metal and alkaline earth metal salts, the acid addition salts, the esters and the amides of the valuable new compounds prepared by the novel fermentation processes; the said salts, esters and amides are within the scope of the instant invention.

For example, carboxylate salts of the 3-cyclohexene-1-hydroxyacetic acid disclosed and claimed herein readily may be obtained by mixing stoichiometrically equivalent amounts of the said acid in aqueous solution with alkali metal or alkaline earth metal hydroxides in aqueous solution and evaporating the water. Suitable hydroxides are, for example, sodium hydroxide, potassium hydroxide, calcium hydroxide, and the like.

The minimum water-solubility of the instant (+)-3-cyclohexene-glycine, which is an amino acid, occurs within its so-called isoelectric range, from about pH 4 to about 8, where the zwitterion form predominates. Water solubility is enhanced by preparation of salts of the carboxylate group by reaction with stoichiometrically-equivalent amounts of alkali metal- or alkaline earth metal hydroxides such as sodium hydroxide, potassium hydroxide, calcium hydroxide, and the like. Alternatively, salts of the amino group can be prepared by reaction with mineral acids or organic acids such as phosphoric acid, sulfuric acid, hydrochloric acid, trichloroacetic acid, and the like. The salts can be employed either in the solutions in which they are prepared or in the solid form, which is obtained following evaporation of the solution to dryness.

The following examples are given by way of illustration and are not to be construed as limitations of this invention, many variations of which are possible without departing from the spirit or scope thereof.

*Example I*

A slant of *S. antibioticus* ATCC 14890 on Emerson Agar is cultivated to develop spores for the purpose of inoculating a nutrient medium of the following composition:

| | Grams |
|---|---|
| Cerelose (dextrose hydrate) | 10 |
| Curbay-BG (molasses residue) | 5 |
| Cornstarch | 10 |
| Soybean meal | 10 |
| Sodium chloride | 5 |

This mixture of nutrients is diluted to a volume of 1 liter with water, is adjusted to a pH of 7 with potassium hydroxide and is sterilized at 121° C. for thirty minutes. The medium is then cooled and the spores are added aseptically. The organism is cultivated in Fernbach flasks on a reciprocating shaker at 28° C. for two days. The mixture of broth and mycelium formed thereby is transferred to 20 volumes of sterile fermentation broth having the same composition, adjusted to pH 7. After seeding the medium with the organisms from the Fernbach flasks, the mixture is agitated and aerated at 28° C. for 108 hours. The potency of the broth is measured against *A. aerogenes*. The mycelium is removed by filtration and the filtrate is adjusted to pH 2.8 with phosphoric acid.

The filtered broth is passed through a tower containing a volume of ion exchange resin (Amberlite IR–120, produced by Rohm & Haas Co., Philadelphia, Pennsylvania, previously washed with sulfuric acid, then with water until the effluent wash water reaches a pH of about 4) in the hydrogen cycle, said resin volume being about 7% of the total broth volume. The effluent is reserved for recovery of (+)-3-cyclohexene-1-hydroxyacetic acid and (+)-3-cyclohexene-1-glyoxylic acid.

The resin, which contains adsorbed thereon (+)-3-cyclohexene-1-glycine, is washed with deionized water until the effluent pH reaches approximately 4.0, and the wash water is discarded. The resin is then treated with a solution of 1 part of concentrated ammonium hydroxide in 10 parts of water (approximately 1.5 N) and the effluent is discarded until the pH increases above 5, then is collected as eluate. An amount of eluate equivalent to 15% of the original broth volume is collected. The eluate is concentrated in a vacuum at a temperature of $35 \pm 5°$ C. until it has reached ½ volume during which excess ammonia is removed then the concentrate is adjusted to pH 4.5 with phosphoric acid. The concentration is then continued until the suspension contains 10% total solids. The solids are removed by filtration and washed with a small amount of water then with 95% ethanol. The solids comprise a mixture of ammonium phosphate and (+)-3-cyclohexene-1-glycine from which the said glycine is recovered by the following procedure: A slurry of 1 part of the solids in 3.3 parts of water is filtered then the filter cake is washed with 0.45 part of water and 0.67 part of ethanol and is air-dried. A suspension of 1 part of the dried cake in 21 parts of water is adjusted to pH 1.65 with 50% phosphoric acid, is treated with 0.15 part of decolorizing charcoal, is stirred for 1 hour and is filtered. The filtrate is then adjusted to pH 4.5 with 2.5 l. of 5 N potassium hydroxide and is stirred overnight. The crystals of (+)-3-cyclohexene-1-glycine are recovered by filtration and dried to a constant weight, M.P., about 300°, with decomposition, $[\alpha]_D$ +100° (c. 1 in 2% aqueous $H_3PO_4$).

A recrystallized sample $[\alpha]_D$ +110 ($\pm 10°$) (c. 1 in 2% aqueous $H_3PO_4$) is analyzed:

Calc. for $C_8H_{13}NO_2$: C, 61.91; H, 8.44; N, 9.03. Found: C, 61.84; H, 8.31; N, 9.08.

For recovery of (+)-3-cyclohexene-1-hydroxyacetic acid, the effluent from the ion exchange resin, reserved above, is adjusted, *if necessary*, to pH 1.5 by the addition of sulfuric acid. The effluent is then extracted with ⅕ volume of methyl isobutyl ketone. The inorganic layer is separated and is extracted with 3.5% disodium phosphate buffer solution; ⅕ volume based on the volume of organic layer is used. The phosphate buffered solution is separated from the organic layer and is adjusted to pH 4.0 with phosphoric acid and the resulting solution is extracted with methylene chloride, ⅕ volume. The methylene chloride layer is separated and the solvent is evaporated therefrom; the residue remaining from evaporation is crude (+)-3-cyclohexene-1-hydroxyacetic acid.

Recrystallization from benzene yields an analytically pure product, M.P. 118.5–120.5° C., $[\alpha]_D + 78°$ (c. 1, $H_2O$).

Calcd. for $C_8H_{12}O_3$: C, 61.52; H, 7.75. Found: C, 61.34; H, 7.73.

For recovery of (+)-3-cyclohexene-1-glyoxylic acid, the aqueous phase is adjusted to pH 1.5 with phosphoric acid, over methylene chloride. The methylene chloride layer is separated and is treated with an equal volume of isopropanol and heated until all of the methylene chloride is distilled. The isopropanol solution is then adjusted to pH 5.5 with 3 N methanolic potassium hydroxide which affords the crystalline potassium salt of (+)-3-cyclohexene-1-glyoxylic acid, which is removed by filtration, and dried.

*Example II*

The fermentation procedure of Example I is repeated, this time substituting for *S. antibioticus* ATCC 14890, *S. antibioticus* strain ATCC 11891. As is disclosed hereinbefore, the said strain 11891, in addition to producing the valuable new antibiotics of the instant invention, co-produces oleandomycin and (+)-3-cyclohexene-1-glyoxylic acid. The new antibiotics of the instant invention and the co-produced antibiotics are separated and recovered from the fermentation broth by the following procedure:

The filtered broth is passed through a tower containing a volume of cation exchange resin (Amberlite IR–120, produced by Rohm and Haas Co., Philadelphia, Pa., which resin previously has been washed with sulfuric acid, then with water until the effluent wash water reaches a pH of about 4) in the hydrogen cycle, the said resin being present in an amount to provide about 7% of the total broth volume. The effluent is reserved for recovery of oleandomycin, (+)-3-cyclohexene-1-hydroxyacetic acid and (+)-3-cyclohexene-1-glyoxylic acid.

The resin, which contains adsorbed thereon (+)-3-cyclohexene-1-glycine, is washed with deionized water until the effluent pH reaches approximately 4.0, and the wash water is discarded. The resin is then treated with a solution of 1 part of concentrated ammonium hydroxide in 10 parts of water (approximately 1.5 N) and after the effluent is discarded until the pH increases about 5, then is collected as eluate. An amount of eluate equivalent to 15% of the original broth volume is collected. The eluate is concentrated in a vacuum at a temperature of 35 ±5° C. until it has reached ½ volume during which excess ammonia is removed then the concentrate is adjusted to pH 4.5 with phosphoric acid. The concentration is then continued until the suspension contains 10% total solids. The solids are removed by filtration and washed with a small amount of water then with 95% ethanol. The solids comprise a mixture of ammonium phosphate and (+)-3-cyclohexene-1-glycine from which the said glycine is recovered by the following procedure: A slurry of 1 part of the solids in 3.3 parts of water is filtered then the filter cake is washed with 0.45 part of water and 0.67 part of ethanol and is air-dried. A suspension of 1 part of the dried cake in 21 parts of water is adjusted to pH 1.65 with 50% phosphoric acid, is treated with 0.15 part of decolorizing charcoal, is stirred for 1 hour and is filtered. The filtrate is then adjusted to pH 4.5 with 2.5 l. of 5 N potassium hydroxide and is stirred overnight. The crystals of (+)-3-cyclohexene-1-glycine are recovered by filtration and dried to a constant weight, M.P., about 300° (dec.), $[\alpha] + 100$ (c. 1 in 2% aqueous $H_3PO_4$).

To recover oleandomycin, the effluent from the ion exchange tower, reserved above, is adjusted to pH 1.5 with sulfuric acid. It is extracted with ⅕ volume of methyl isobutyl ketone, and the organic layer is separated and reserved for recovery of (+)-3-cyclohexene-1-hydroxyacetic acid and (+)-3-cyclohexene-1-glyoxylic acid. The acid layer, after extraction with ketone, which contains oleandomycin as its acid salt, is adjusted to pH 9.5 with sodium hydroxide solution. The oleandomycin which is liberated by this treatment is extracted with ⅕ volume of methyl isobutyl ketone. Evaporation of the solvent, in a vacuum, affords oleandomycin as a residue. The procedure outlined in Example I is employed to recover (+)-3-cyclohexene-1-hydroxyacetic acid and (+)-3-cyclohexene-1-glyoxylic acid from the organic layer, reserved above.

*Example III*

The sodium salt of (+)-3-cyclohexene-1-glycine is prepared by treating an aqueous solution of the said glycine with a stoichiometrically-equivalent amount of aqueous sodium hydroxide and evaporating the solution to dryness. By the same procedure, substituting for the sodium hydroxide, aqueous solutions of lithium hydroxide, potassium hydroxide, calcium hydroxide and magnesium hydroxide there are obtained, respectively, the lithium, potassium, calcium and magnesium salts of (+)-3-cyclohexene-1-glycine.

The hydrochloric acid addition salt of (+)-3-cyclohexene-1-glycine is prepared by adding to an aqueous solution of the said glycine a stoichiometrically-equivalent amount of aqueous hydrochloric acid and evaporating the solution to dryness. In a similar manner there are prepared the phosphoric-, sulfuric-, and trichloroacetic acid-addition salts of (+)-3-cyclohexene-1-glycine.

The alkali metal- and alkaline-earth metal salts of 3-cyclohexene-1-hydroxyacetic acid are prepared by the above procedure. There are obtained the lithium, potassium, sodium, calcium and magnesium salts of said hydroxyacetic acid.

*Example IV*

The methyl ester of (+)-3-cyclohexene-1-glycine is prepared by refluxing a mixture containing the glycine in an excess of methyl alcohol and in the presence of a catalytic amount of hydrogen chloride, then evaporating the excess solvent. Following the same procedure the ethyl and the i-propyl esters of said glycine are prepared. The t-butyl ester is prepared by refluxing a mixture of the glycine and a stoichiometrically-equivalent amount of t-butanol in a non-reactive solvent and in the presence of a catalytic quantity of sulfuric acid, and recovering the ester by distillation.

The procedure is repeated substituting for the said glycine a stoichiometrically equivalent amount of 3-cyclohexene-1-hydroxyacetic acid. There are obtained the methyl, ethyl, isopropyl, and t-butyl esters of the said hydroxyacetic acid.

These procedures are used to prepare the following esters substituting the appropriate hydroxy compounds for the above mentioned alcohols:

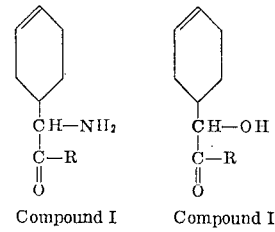

Compound I     Compound II

COMPOUND I, R

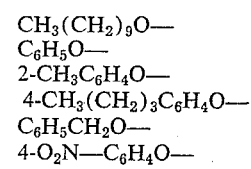

$CH_3(CH_2)_9O-$
$C_6H_5O-$
$2-CH_3C_6H_4O-$
$4-CH_3(CH_2)_3C_6H_4O-$
$C_6H_5CH_2O-$
$4-O_2N-C_6H_4O-$

COMPOUND II, R

CH₃(CH₂)₉O—
C₆H₅O—
2-CH₃C₆H₄O—
4-CH₃(CH₂)₃C₆H₄O—
C₆H₅CH₂O—
4-O₂N—C₆H₄O—

*Example V*

The amide of (+)-3-cyclohexene-1-glycine is prepared by treating the methyl ester of Example IV with a solution of a stoichiometrically-equivalent amount of ammonia in methanol, refluxing the mixture until amide formation is complete and evaporating the solvents. By the same procedure substituting methanolic solutions of appropriate amines for ammonia, there are obtained the N-methyl amide, the N-ethyl amide, the N-hexyl amide and the N-decyl amide of (+)-3-cyclohexene-1-glycine.

The procedure is repeated substituting for the glycine, 3-cyclohexene-1-hydroxyacetic acid. There are obtained the amide, the N-methyl amide, the N-ethyl amide, the N-hexyl amide and the N-decyl amide derivatives thereof.

*Example VI*

The N-acetyl derivative of (+)-3-cyclohexene-1-glycine is prepared by mixing aqueous solutions of the glycine and acetic anhydride at 30° C., allowing the mixture to stand until the reaction is complete and distilling off the solvent and acetic acid by-product leaving the product as a residue.

The N-benzoyl derivative of (+)-3-cyclohexene-1-glycine is prepared by adding an excess of 20% aqueous sodium hydroxide to a suspension in water of benzoyl chloride and a stoichiometrically-equivalent amount of the said glycine, and shaking vigorously. The aqueous solution of the sodium salt of the desired derivative is acidified to Congo red with dilute hydrochloric acid and the solid product, which separates is recrystallized from (60% ethanol, M.P. 174–176° C., $[\alpha]_D +77°$ (c. 1, 0.5 M aq. K₂HPO₄). By the same procedure are prepared the N-carbobenzoxy derivative, M.P., 109° C., $[\alpha]_D +60°$ (c. 3.5, isopropanol) the N-4-i-propyl benzoyl derivative and the N-n-decanoyl derivative of (+)-3-cyclohexene-1-glycine.

*Example VII*

The O-acetyl derivative of 3-cyclohexene-1-hydroxyacetic acid is prepared by dissolving the acid in 5% aqueous sodium hydroxide solution and adding a small amount of ice and a slight excess of acetic anhydride. The mixture is stirred vigorously, for about 12 hours then is acidified with 5% hydrochloric acid and the precipitated product is removed by filtration. The O-benzoyl derivative is prepared by shaking a mixture of about 20 ml. of 5% sodium hydroxide solution, 0.5 g. of the said acid, 5 ml. of chloroform and 0.5 g. of benzoyl chloride for 20 minutes then allowing the mixture to stand for 12 hours. The chloroform layer is separated and evaporated to about 2–3 ml. Ten volumes of hexene is added and the product is removed by filtration and washed with hexene. By the same procedure there is obtained the O-4-i-propylbenzoyl derivative of 3-cyclohexene-1-hydroxyacetic acid.

*Example VIII*

The procedure of Example IV is used to prepare esters of the N-acyl derivatives of Example VI. Among the compounds prepared is the p-nitrophenyl ester of the carbobenzoxy derivative of (+)-3-cyclohexene-1-glycine:

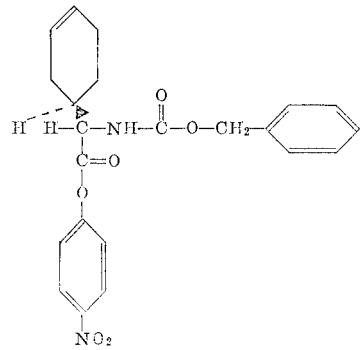

The product, after recrystallization from isopropyl ether, has the following properties: M.P., 80–81° C. and $[\alpha]_D +22.5°$ (c. 2, dioxane).

*Example IX*

The carbobenzoxy derivative of (+)-3-cyclohexene-1-glycine (Example VI), 3.6 g., and N-ethyl piperidine, 1.92 ml., are dissolved in 50 ml. of acetone at —5° C., and then 1.18 ml. of ethyl chloroformate is added; after 1 hour at —5° C., the mixture which contains the mixed anhydride:

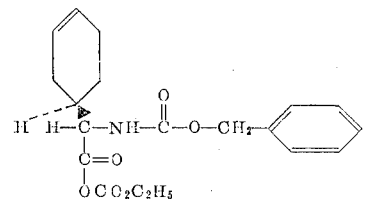

is cooled to —40° C. A solution of 3.24 g. of 6-aminopenicillanic acid in 63 ml. of 3% NaHCO₃ and 35 ml. of acetone, at —3° C., is added. The reaction mixture is stirred for 15 minutes at —15° C., and for 1 hour without external cooling. The solution is adjusted from pH 8.4 to 7.7 with 50% H₃PO₄, then is extracted with 100 ml. of diethyl ether. The aqueous phase is separated and is adjusted to pH 2.5 then is extracted once with 250 ml. and once with 100 ml. of methyl isobutyl ketone (MIK). The MIK extracts are combined and washed with 50 ml. of water. The MIK extracts are then extracted with 250 ml. of water adjusted to pH 7 with 5 N KOH solution. The aqueous extracts are freeze dried to yield 5.3 g. of the potassium salt of the desired penicillin, $[\alpha]_D +192$ (c. 2, H₂O):

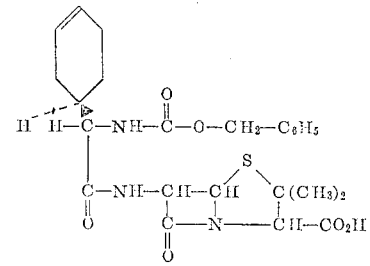

A solution of 4 g. of this compound in 20 ml. of water is added to 7.5 g. of pre-reduced 30% palladium on barium carbonate catalyst suspended in 70 ml. of water and is hydrogenated at 50 p.s.i. for 0.5 hours. The catalyst is removed by filtration and the filtrate is chilled to 6° C. and is adjusted to pH 2.5 with 50% H₃PO₄ over an equal volume of methylene chloride. The phases are separated and the aqueous phase is extracted with an equal volume of methylene chloride. The aqueous phase is adjusted to pH 5 with 5 N KOH solution then is concentrated in vacuo at 27° C. The crystals which separated are recovered by filtration, washed with a small amount of water, then with acetone and are then dried, yield 686 mg., $[\alpha]_D$ +120° (c. 1, water).

The relative microbiological activities of the carbobenzoxy penicillin, A, and its hydrogenated product, B, are set forth in Table III:

TABLE III.—COMPARATIVE ZONES INHIBITION

| Microgram Compound per Disc | Versus B. Subtilis, mm. | | Versus A. aerogenes, mm. | |
|---|---|---|---|---|
| | A | B | A | B |
| 1,000 | 42 | 47 | 19 | 40 |
| 100 | 36 | 40 | NZ | 30 |
| 10 | 29 | 34 | NZ | 20 |
| 1 | 22 | 29 | NZ | NZ |
| 0.1 | 16 | 22 | NZ | NZ |

NZ—No zone.

Both the compounds are active antibiotics; the hydrogenated compound showing somewhat greater activity.

*Example X*

The methyl ester of (+)-3-cyclohexene-1-glyoxylic acid, prepared as described in the hereinbefore cited U.S. Patent No. 3,271,439, 11.7 g., is added to a suspension of 30 g. of aluminum isopropoxide in 1-l. of isopropanol. The reaction mixture is distilled at atmospheric pressure until acetone ceases to distil and 500 ml. of distillate is then collected. The mixture is evaporated under reduced pressure and the residue is treated with 250 ml. of methylene chloride and 100 ml. of water. The aqueous phase is adjusted to pH 4.3 with 0.1 N aqueous HCl and the methylene chloride layer is collected and washed twice with 250 ml. of water. The washed methylene chloride layer is evaporated and the residual oil is distilled under high vacuum. The product is the isopropyl ester of (+)-3-cyclohexene-1-hydroxyacetic acid.

Calcd. for $C_{11}H_{18}O_3$: C, 66.64; H, 9.15. Found: C, 66.24; H, 9.04.

A solution of 3 g. of this ester in 180 ml. of isopropanol, $\alpha_D = +0.75$ (1 dm.) is treated with 20 ml. of 2 N methanolic KOH and after 4 hours the resulting heavy crystalline precipitate is recovered by filtration and is washed with isopropanol. The potassium salt weighs 2.0 g. This is dissolved in 10 ml. of water and is adjusted to pH 1.5 with 50% $H_3PO_4$ solution over 50 ml. of methylene chloride. Crystals, which separate at the interface are collected by filtration, M.P. 135–136° C., yield, 1.7 g. Recrystallization from benzene affords 3-cyclohexene-1-hydroxyacetic acid, M.P., 136–137°, $[\alpha]_D$ +61 (c. 1.5 in 50% aqueous methanol); this material is believed to be "semi-racemic" with a (±)-α-position and a (+)-1-position.

Calcd. for $C_8H_{12}O_3$: C, 61.52; H, 7.75. Found: C, 61.48; H, 7.69.

*Example XI*

The use of appropriate (+)-3-cyclohexene-1-hydroxyacetic acid as an intermediate in the preparation of (+)-3-cyclohexene-1-glycine is illustrated by conversion of the said hydroxyacetic acid to the 3-cyclohexene-1-chloroacetic acid of opposite configuration with $PCl_5$ reagent followed by conversion of the said chloroacetic acid with ammonia reagent to the (+)-3-cyclohexene-1-glycine of desired configuration.

What is claimed is:
1. A compound selected from the group consisting of those of the formula:

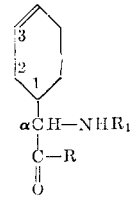

the compound wherein R is hydroxyl and $R_1$ is hydrogen having in its pure crystalline form a melting point, with decomposition, of above about 300° C. and a specific rotation of $[\alpha]_D$, +110°(±10°) (c. 1 in 2% aq. $H_3PO_4$), and exhibiting in a potassium bromide pellet characteristic absorption in the infrared region of the spectrum at the following frequencies expressed in microns: 2.90, 3.40 (cluster), 3.65, 3.80, 4.70, 6.30, 6.60, 7.05, 7.15, 7.25, 7.60, 7.95, 8.25, 8.65, 9.20, 9.30, 9.55, 9.80, 10.45, 10.65, 10.90, 11.30, 11.60, 12.00, 12.40, 12.95, 13.70, 14.10; derivatives thereof in which R is selected from the group consisting of hydroxyl, alkoxy containing up to ten carbon atoms, phenoxyl, alkyl-substituted phenoxyl containing up to ten carbon atoms, benzyloxyl, amino and monoalkylamino containing up to ten carbon atoms and $R_1$ is selected from the group consisting of hydrogen, alkanoyl containing up to ten carbon atoms, benzoyl, alkyl-substituted benzoyl containing up to ten carbon atoms and benzyloxycarbonyl; and alkali metal, alkaline earth metal and acid addition salts of said compounds.

2. A compound of the formula:

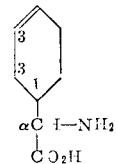

having in its pure crystalline form a specific rotation of $[\alpha]_D$, +110°(±10°) (c. 1 in 2% aq. $H_3PO_4$) and which in a potassium bromide pellet exhibits characteristic absorption in the infrared region of the spectrum at the following frequencies expressed in microns: 2.90, 3.40 (cluster), 3.65, 3.80, 4.70, 6.30, 6.60, 7.05, 7.15, 7.25, 7.60, 7.95, 8.25, 8.65, 9.20, 9.30, 9.55, 9.80, 10.45, 10.65, 10.90, 11.30, 11.60, 12.00, 12.40, 12.95, 13.70, 14.10 and alkali metal, alkaline earth metal and acid addition salts of said compound.

3. A compound selected from the group consisting of those of the formula:

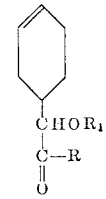

wherein:
(a) R is selected from the group consisting of hydroxyl, alkoxyl containing up to ten carbon atoms, phenoxyl, alkyl substituted phenoxyl containing up to ten carbon atoms, benzyloxyl, amino and monoalkylamino containing up to ten carbon atoms; and
(b) $R_1$ is selected from the group consisting of alkanoyl containing up to ten carbon atoms, benzoyl, alkyl-substituted benzoyl containing up to ten carbon atoms;
and the alkali metal and alkaline earth metal salts thereof.

4. (+)-3-cyclohexene-1-hydroxyacetic acid.
5. Methyl (+)-3-cyclohexene-1-hydroxyacetate.
6. A process for separating (+)-3-cyclohexene-1-hydroxyacetic acid from (+)-3-cyclohexene-1-glycine acid which comprises:
  (a) adjusting a solution comprised of said acid, said glycine and water to a pH of 4.0 and extracting said solution with methylene chloride;
  (b) recovering (+)-3-cyclohexene-1-hydroxyacetic acid from said methylene chloride extract and
  (c) recovering (+)-3-cyclohexene-1-glycine from the extracted aqueous phase.

References Cited by the Examiner

Edelson et al.: "J. Am. Chem. Soc.," vol. 80 (1958), pp. 2698–2700, QD1.A5.

LORRAINE A. WEINBERGER, *Primary Examiner.*

RICHARD K. JACKSON, *Examiner.*